Sept. 20, 1955 G. A. DEAN 2,718,153
DRIVE MECHANISM
Filed June 2, 1953 2 Sheets-Sheet 1
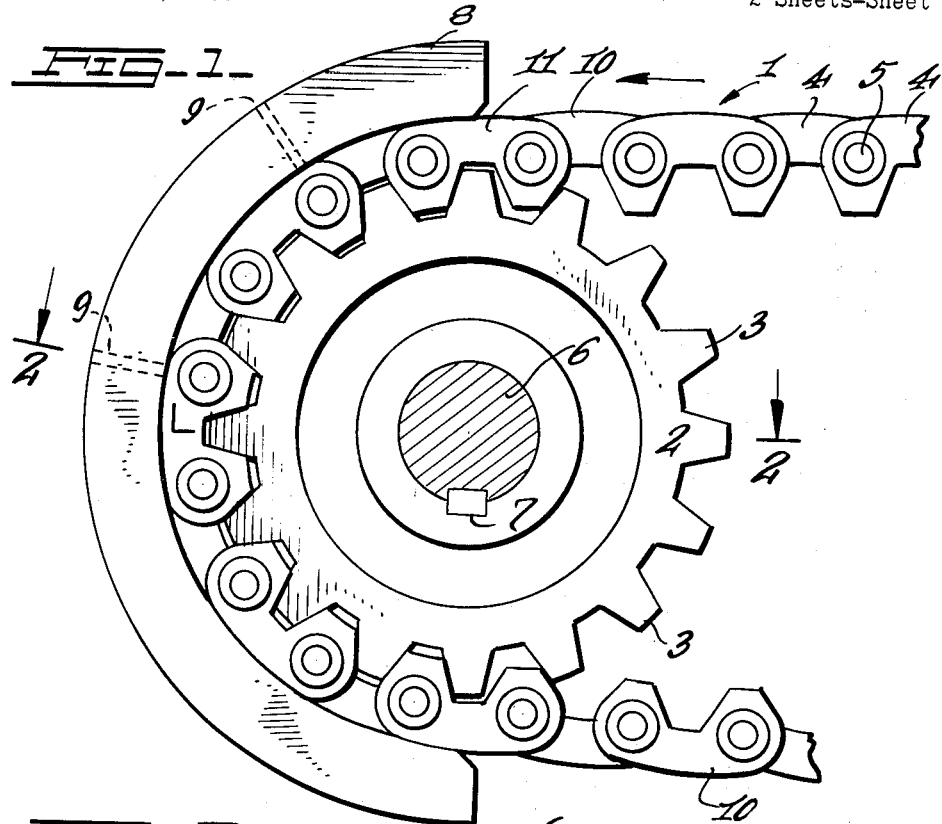
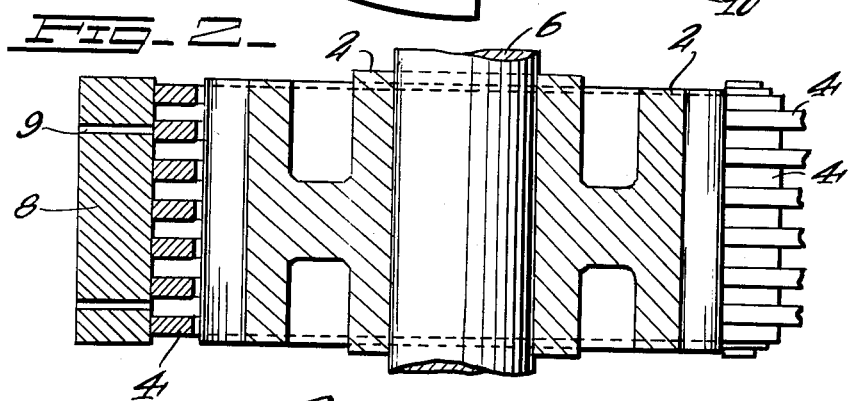
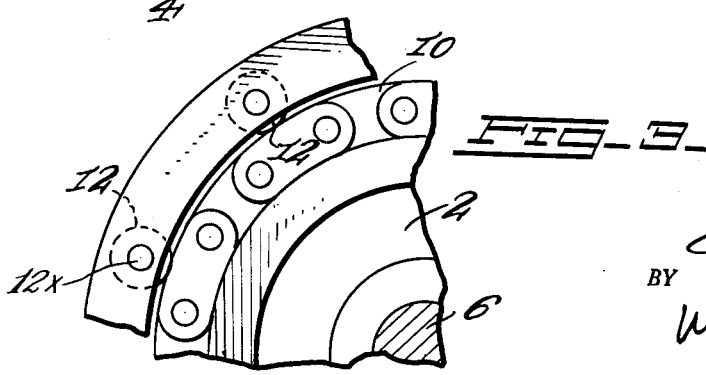
INVENTOR.
GEORGE A. DEAN.
BY
W. Lee Helms
ATTORNEY.

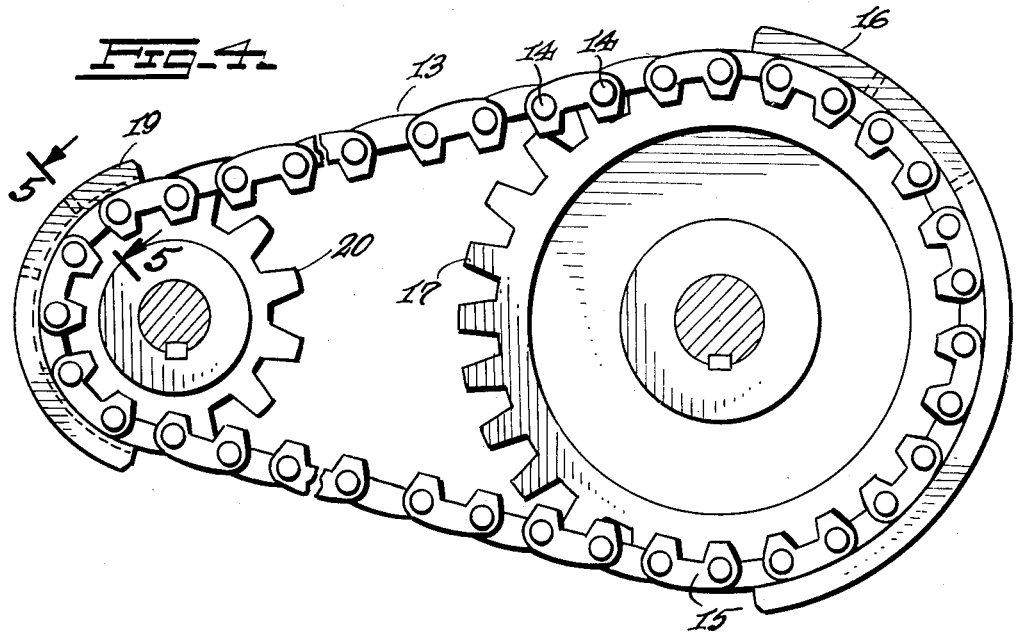
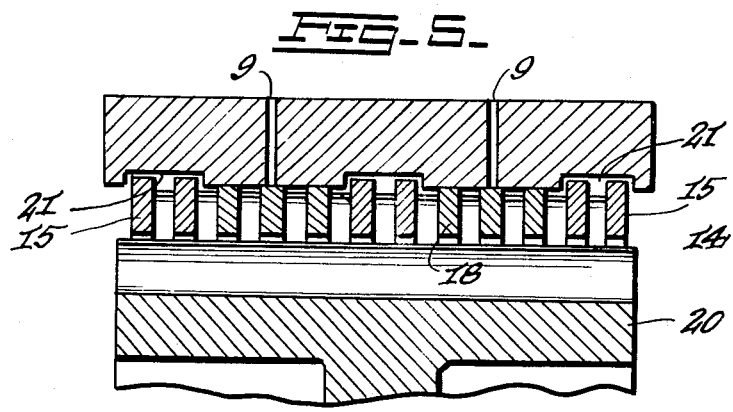
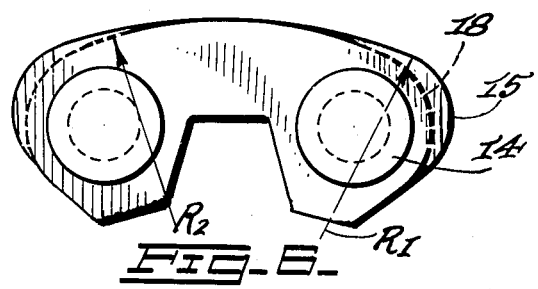

United States Patent Office 2,718,153
Patented Sept. 20, 1955

2,718,153

DRIVE MECHANISM

George A. Dean, Allendale, N. J.

Application June 2, 1953, Serial No. 359,167

2 Claims. (Cl. 74—219)

This invention relates to a drive mechanism and more particularly to a mechanism adapted to engage the individual links of a drive chain.

The use of drive chains at high speeds tends to cause the chain to fly away from the driver or driven gear due to the centrifugal force and momentum of the metal chain.

It is an object of this invention to provide a curvatured retainer plate adapted to engage the links of a chain disposed about a sprocket wheel.

It is a further object of this invention to provide a parabolic retainer plate having rollers affixed to its inner surface, said rollers being adapted to engage the individual links of a drive chain.

It is another object of this invention to provide a link chain having curvatured links adapted to engage rollers of a retainer plate disposed about a sprocket.

It is yet another object of this invention to provide retainer plates adapted to engage a chain drive disposed over both the driver and driven sprocket wheels when said wheels are of different diameter.

It is another object of this invention to operate chain drives at high speeds heretofore unattainable.

These and other objects of this invention will become apparent upon reading the following descriptive disclosure taken in conjunction with the accompanying drawing in which:

Fig. 1 is a side elevation of a retainer plate in engagement with the individual links of a chain disposed about a sprocket, Fig. 2 is a sectional view taken on line 2—2 of Fig. 1, Fig. 3 is a modification broken away in part and showing rollers disposed in the retainer plate, Fig. 4 is a side elevation, broken away in part, of a driver sprocket wheel of a different diameter than the driven sprocket wheel, Fig. 5 is a cross section taken on line 5—5 of Fig. 4 and showing relief cut-out channels disposed in the driver housing, and Fig. 6 is a side view of the two types of links used in the link chain of the modification shown in Figs. 5 and 6.

Referring to the Figs. 1 to 3, wherein the driver sprocket wheel and driven sprocket wheel are of the same diameter, a sprocket chain 1 is disposed about both a driven and driver sprocket wheel 2, having gear teeth 3. The chain 1 consists of a plurality of double toothed links 4 in series and in parallel relationship (Fig. 2) pivotally secured together by means of rods 5. The sprocket wheel 2 is keyed to an axle 6 by means of a key 7.

A retainer plate 8 having oil holes 9 therein is curvilinearly disposed about the sprocket wheel 2 with the chain 1 thereon and is rigidly and immovably secured to a standard (not shown).

The radius of curvature of the retainer plate 8 is of great importance and must be that of the radius of curvature of the backs of the links disposed against rubbing or wear surface of said retainer plate 8. In short the retainer plate 8 is a bearing surface for the chain 1 and its links 4, the radius of curvature of the surfaces 10 of the back of the links being equal to the radius of curvature of inside curve of plate 8.

In operation the chain 1 running at a high linear speed tends to continue in a straight line to the left (Fig. 1). When link 11 (Fig. 2) enters into the space between plate 8 and wheel 2, it immediately engages the rubbing surface of said plate and slides therealong until it emerges from below. Thus the plate 8 retains the links 4 in engagement with sprocket wheel teeth 3 and behaves as a back-plate since it is immovably secured to a standard or frame-piece (not shown). In order to reduce the rubbing friction of the curved backs of the links 4 against the curved wearing surface of plate 8, oil may be intermittently or continuously applied through the oil holes 9. By use of this invention the links 4 are held in engagement with the sprocket wheel teeth 3, regardless of the speed of the chain and its tendency to stretch and also to fly away from the sprocket wheel at very high speeds heretofore unattainable.

In the modification shown in Fig. 3 the retainer plate is provided with rollers 12, journaled to the plate on axles 12x. The rollers may be set in recesses disposed in a solid plate and in which case they need not be provided with axles. In any event the radius of curvature of the circle formed by touching the inwardly disposed points of tangency of rollers 12 and the radius of curvature of the curved surfaces 10 of the backs of links 4 must be substantially equal. When these radii of curvature are equal, optimum conditions prevail, and the frictional forces obtained between the retainer plate wear surface or the rollers thereon and the back of links 4 are at a minimum value.

Where the speed of the driver wheel on an electric motor, for example, is equal to that of the driven wheel, so that their diameters are equal, an identical retainer plate 8 is disposed both about the driver sprocket wheel as well as about the driven sprocket wheel. Manifestly, where the driver wheel has a different diameter than the driven wheel, the radii of curvature of each retainer plate is different. Where the diameter of the driven wheel is different from that of the driver wheel, the radius of curvature of the respective housings differ. In this instance the chain is modified to carry two types of links (Figs. 4-6).

The chain 13 in the modification of Figs. 4–6 is provided with an equal number of links having the same large radius of curvature as the number of links having the same small radius of curvature. Preferably the number of large links and the number of small links are numerically equal on a common pair of rods 14 (Fig. 5).

As shown in Figs. 4-6 the radius of curvature of the links differ whenever the diameters of the driver and the driven sprocket differ. The large radius of curvature $R_1$ of the larger links 15 are of a configuration to mate with the radius of curvature of the inside surface of the housing 16 of the driven sprocket 17. The inside surface of housing 16 is smooth and both types of links bear against this surface, the larger link 15 bearing on a greater area than the smaller link 18 (Fig. 6).

The housing 19 for the driver sprocket 20 of the modification shown in Figs. 4-6, is provided with a plurality of channels 21 adapted to receive the larger links 15 as they turn about the sprocket (Fig. 5). The smaller links 18 engage the non-channeled inner surface of housing 19 at substantially their entire back surfaces.

This invention has been illustrated by means of a plurality of embodiments thereof but it is not to be limited to these illustrative embodiments but only to the claims appearing hereinafter.

Having described my invention, what I claim and desire to secure by Letters Patent is as follows:

1. An apparatus comprising a belt chain consisting of a plurality of chain links having curvatured backs, half of said links being small and having a first radius of curvature, and the other half being large and having a larger second radius of curvature, a drive sprocket wheel, a driven sprocket wheel of a larger diameter than that of the drive wheel, a curvatured channeled first housing having a non-channeled bearing face with said first radius of curvature, said channeled housing being disposed outwardly of said drive wheel, and a curvatured second housing having said second radius of curvature which is larger than that of the first housing, said second housing being disposed outwardly of the driven wheel.

2. A drive mechanism comprising a small drive sprocket wheel, a larger driven sprocket wheel, a channeled first housing having a smooth non-channeled bearing surface of a first radius of curvature and disposed about said drive sprocket, a second housing having an inner bearing surface having a second radius of curvature and disposed about said driver sprocket, and a link chain having links with curvatured backs, half of said links having said first small radius of curvature while the remainder have said second larger radius of curvature, said links being disposed in equal number transversely of said link chain and said larger links being disposed to travel in part in said channel of said channeled housing.

References Cited in the file of this patent
UNITED STATES PATENTS

| | | |
|---|---|---|
| 551,811 | Curtis | Dec. 24, 1895 |
| 1,762,034 | Silberberger | June 3, 1930 |
| 1,906,478 | Maxwell | May 2, 1933 |
| 1,953,652 | Holmes | Apr. 3, 1934 |
| 1,972,555 | Fear | Sept. 4, 1934 |
| 2,240,523 | Schramm | May 6, 1941 |
| 2,272,981 | Nelson | Feb. 10, 1942 |
| 2,551,821 | Bengston | May 8, 1951 |